United States Patent
Dubus et al.

(10) Patent No.: US 10,781,900 B2
(45) Date of Patent: Sep. 22, 2020

(54) PLANETARY ROLLER SCREW MECHANISM

(71) Applicant: Aktiebolaget SKF, Gothenburg (SE)

(72) Inventors: Jerome Dubus, Aix Les Bains (FR); Christian Boch, Chambery (FR)

(73) Assignee: Aktiebolaget SKF, Gothenburg (SE)

( * ) Notice: Subject to any disclaimer, the term of this patent is extended or adjusted under 35 U.S.C. 154(b) by 339 days.

(21) Appl. No.: 15/532,215

(22) PCT Filed: Dec. 9, 2014

(86) PCT No.: PCT/EP2014/077082
§ 371 (c)(1),
(2) Date: Jun. 1, 2017

(87) PCT Pub. No.: WO2016/091290
PCT Pub. Date: Jun. 16, 2016

(65) Prior Publication Data
US 2018/0328471 A1    Nov. 15, 2018

(51) Int. Cl.
*F16H 25/22* (2006.01)
*F16H 25/14* (2006.01)

(52) U.S. Cl.
CPC ......... *F16H 25/2252* (2013.01); *F16H 25/14* (2013.01)

(58) Field of Classification Search
CPC ................................... F16H 25/2252
See application file for complete search history.

(56) References Cited

U.S. PATENT DOCUMENTS

| | | | | |
|---|---|---|---|---|
| 2,683,379 A | * | 7/1954 | Strandgren | F16H 25/2252 74/424.92 |
| 3,173,304 A | * | 3/1965 | Strandgren | F16H 25/2252 74/409 |
| 3,406,584 A | * | 10/1968 | Roantree | F16H 25/2252 74/424.7 |
| 4,648,285 A | * | 3/1987 | Carson | F16H 25/2252 74/424.75 |

(Continued)

FOREIGN PATENT DOCUMENTS

CN   102597551 A   7/2012
DE    1931860 A1   1/1970

(Continued)

OTHER PUBLICATIONS

EPO Machine Translation DE 1931860 (A1), Lemore, Feb. 1, 1970 (Year: 1970).*

(Continued)

*Primary Examiner* — Vinh Luong
(74) *Attorney, Agent, or Firm* — Laurence A. Greenberg; Werner H. Stemer; Ralph E. Locher

(57) ABSTRACT

A planetary roller screw mechanism includes a screw shaft provided with at least one external thread, a nut provided with at least three internal threads and at least three rollers arranged, radially with respect to a central axis of the screw shaft, between the screw shaft and the nut. Each roller is provided with at least two external threads. The number of external threads of the screw shaft is a multiple of the number of external threads of a roller. The number of internal threads of the nut is a multiple of the number of external threads of a roller.

8 Claims, 3 Drawing Sheets

(56) References Cited

U.S. PATENT DOCUMENTS

| | | | | |
|---|---|---|---|---|
| 5,259,267 | A | * | 11/1993 | Jurewicz .................. H01H 9/16 16/441 |
| 5,992,258 | A | * | 11/1999 | Kawase .............. F16H 25/2252 74/424.75 |
| 7,000,495 | B2 | * | 2/2006 | Benoit ................ F16H 25/2252 74/424.89 |
| 2003/0203068 | A1 | * | 10/2003 | Wohlrab ................ B29C 45/66 425/589 |
| 2005/0160856 | A1 | | 7/2005 | Sugitani |
| 2015/0267776 | A1 | * | 9/2015 | Fedosovsky .......... F16H 57/023 475/335 |
| 2015/0300467 | A1 | * | 10/2015 | Allegri .................... F16H 25/24 475/333 |
| 2016/0053874 | A1 | * | 2/2016 | Abevi ................ F16H 25/2252 74/424.92 |
| 2016/0091068 | A1 | * | 3/2016 | Abevi ................ F16H 25/2252 74/424.92 |
| 2018/0209522 | A1 | * | 7/2018 | Dubus ................ F16H 25/2252 |

FOREIGN PATENT DOCUMENTS

| | | | |
|---|---|---|---|
| DE | 19753445 A1 | | 6/1998 |
| FR | 3031554 | * | 7/2016 |
| FR | 3067780 | * | 12/2018 |
| JP | S59147151 A | * | 8/1984 |
| WO | WO 2016043114 A1 | * | 3/2016 ......... F16H 25/2252 |
| WO | WO 2017/025118 A1 | * | 2/2017 |

OTHER PUBLICATIONS

Define nominal diameter—Google Search, Jun. 12, 2019 (Year: 2019).*

EPO machine translation of JPS59147151, Yuya, Aug. 23, 1984 (Year: 1984).*

* cited by examiner

PLANETARY ROLLER SCREW MECHANISM

CROSS REFERENCE

This is a United States National Stage Application claiming the benefit of International Application Number PCT/EP2014/077082 filed on Dec. 9, 2014 of which is incorporated herein by reference in its entirety.

FIELD OF THE INVENTION

This invention relates to a planetary roller screw mechanism which is configured to convert a rotational movement into a translational movement, in direct mode, or to convert a translational movement into a rotational movement, in indirect mode.

BACKGROUND OF THE INVENTION

In the field of mechanical movement conversion, between a rotational movement and a translational movement or vice versa, it is known to use a planetary roller screw mechanism which comprises a first rotating and non-translating member, a second translating and non-rotating member and some rollers arranged, radially with respect to a rotation axis of the rotating member, between the rotating and translating members. In some other applications, the input member and the output member of a planetary roller screw mechanism both rotate, at different speeds or in different directions. Planetary roller screw mechanisms are used in a variety of industries where a linear/rotational motion has to be transformed into a rotational/linear motion, or vice versa. This includes oil and gas industry, mechanical factories, food industry, etc. . . . .

In a planetary roller screw mechanism, the first member can be a screw shaft and the second member can be a nut mounted around the screw shaft, whereas the rollers each have a thread in mesh with threads respectively provided on an outer radial surface of the screw shaft and an inner radial surface of the nut. In such a case, an input loading applied to the mechanism can be either a rotating torque applied on the screw shaft, which induces a linear movement of the nut, thus an axial output force, or an axial effort applied on the nut, which induces a rotation of the screw shaft, thus an output torque. Alternatively, the first member can be the nut and the second member can be the screw shaft. In such a case, the input loading on the mechanism can be a torque applied on the nut, which induces a translating movement of the screw, thus an axial output force, or an axial force applied on the screw, which induces a rotating movement of the nut, thus an output torque.

With this kind of a mechanism, a key efficiency factor is the lead of the mechanism. The lead of a planetary roller screw mechanism is defined as the axial displacement length of the nut in translation for one rotation of 360° of the screw shaft or the axial displacement length of the screw shaft for one rotation of 360° of the nut.

Currently, the lead of a planetary roller screw mechanism is limited to 50 mm or below. This derives from several factors.

First, in such a mechanism, the screw shaft and the nut are generally both provided with several threads. Such threads must be machined simultaneously on the screw shaft. To do this, one uses a grinding wheel which is inclined with respect to a central axis of the screw shaft by an angle which depends on the helix angle of the threads. The bigger this helix angle, the more the grinding wheel must be inclined and the more differences exist between the respective depths of the respective threads. Because of this grinding technology, the deeper a thread, the bigger the corresponding error.

Second, the bigger the helix angle, the higher friction forces occur at the interface between the screw shaft and the rollers. Similarly, the deeper the thread, the bigger the friction forces. Thus, for what concerns the screw shaft, the friction forces and the geometry of the thread profile defined between the threads depend on the helix angle and the threads depth, which induces that these two values must be kept as small as possible.

Third, the internal threads of the nut must be machined on its radial internal surface which is all the more difficult that its helix angle is high, since the support member of the grinding wheel might bump into the nut during the machining operation. Here again, the helix angle and the thread depths are unfavorable parameters for the manufacturing of the nut.

Fourth, the deeper the threads of a planetary roller screw mechanism, the longer it takes to grind the screw shaft, the nut and the rollers.

On the other hand, the capacity or robustness of such a mechanism depends also on the helix angle, the threads depth and the inside nominal diameter of the nut. In practice, the inside nominal diameter of the nut equals the sum of the outer nominal diameter of the screw shaft and twice the outer nominal diameter of a roller. It is known that, for a good meshing of the threads respectively provided on the screw shaft and the rollers, the diameter of the rollers should be proportional to the diameter of the screw shaft and inversely proportional to the number of threads of the screw shaft minus 2. Thus, the larger the number of threads of the screw shaft, the smaller the diameter of the rollers, thus the smaller the inner diameter of the screw and the smaller the capacity or robustness of the planetary roller screw mechanism.

All this implies that it is not easy to change the shape and configuration of the existing planetary roller screw mechanisms, so that their lead is limited to 50 mm or less, because of the helix angle, grinding time and capacity problems identified here-above.

However, it might be of interest to provide planetary roller screw mechanisms with a longer lead, since it would allow translating one member with a relatively high velocity or to rotate one member with a high torque, as compared to existing mechanisms.

Currently, since it is difficult to change the configuration of existing planetary roller screw mechanisms, one prefers using ball screw mechanisms or other technologies, such as hydraulic cylinders, to obtain long leads. In case of a ball screw mechanism, one must organize the recirculation of the balls within the nut, which implies that the axial length of the nut must be increased, thus making the overall mechanism bulky. Alternative technologies, such as hydraulics, require feeding a cylinder with a fluid under pressure, which is sometimes complicated and, in any case, usually more difficult than using a purely mechanical device, such as a planetary roller screw mechanism.

BRIEF SUMMARY OF THE INVENTION

This invention aims at solving these problems with a new planetary roller screw mechanism whose lead can be increased, as compared to similar mechanisms of the prior art, without making the mechanism bulky.

To this end, the invention concerns a planetary roller screw mechanism comprising a screw shaft provided with at least one external thread, a nut provided with at least three internal threads and at least three rollers arranged, radially with respect to a central axis of the screw shaft, between the screw shaft and the nut. According to the invention, each roller is provided with at least two external threads, whereas the number of external threads of the screw shaft is a multiple of the number of external threads of a roller and the number of internal threads of the nut is a multiple of the number of external threads of a roller.

Thanks to the invention, the lead of the planetary roller screw mechanism is multiplied by a coefficient equal to the number of external threads of the rollers, as compared to a planetary roller screw mechanism of the prior art.

According to further aspects of the invention, which are advantageous but not compulsory, the planetary roller screw mechanism might incorporate one or several of the following features, taken in any admissible configuration:
- The number of internal threads of the nut equals the number of external threads of the screw shaft.
- The number of rollers is larger than or equal to 4, preferably larger than or equal to 6.
- A nominal diameter of each roller is related to a nominal diameter of the screw shaft via the following relationship $$D8 = \frac{D4}{N6/N8 - 2}$$

where D8 is the nominal diameter of a roller, D4 is the nominal diameter of the screw shaft, N6 is the number of threads of the nut and N8 is the number of threads of the roller.
- The nominal diameter of each roller is smaller than the nominal diameter of the screw shaft.
- The pitch of the threads of the screw shaft is the same as the pitch of the thread(s) of the nut and the same as the pitch of the threads of each roller.
- The planetary roller screw mechanism has a lead larger than or equal to 50 mm, preferably larger than or equal to 60 mm, and the depth of all threads is smaller than or equal to 10 mm, preferably smaller than or equal to 6 mm.
- The number of threads of the screw shaft equals 10, the number of threads of each roller equals 2 and the pitch of all threads is between 4 and 12 mm, preferably between 6 and 10 mm.
- The number of threads of a roller is smaller than the number of threads of the screw shaft and smaller than the number of threads of the nut.
- The number of threads of a roller is less than half the number of threads of the screw shaft.

BRIEF DESCRIPTION OF THE SEVERAL VIEWS OF THE DRAWING

The invention will be better understood on the basis of the following description which is given in correspondence with the annexed figures and as an illustrative example, without restricting the object of the invention. In the annexed figures.

DETAILED DESCRIPTION OF THE INVENTION

Figure 1:
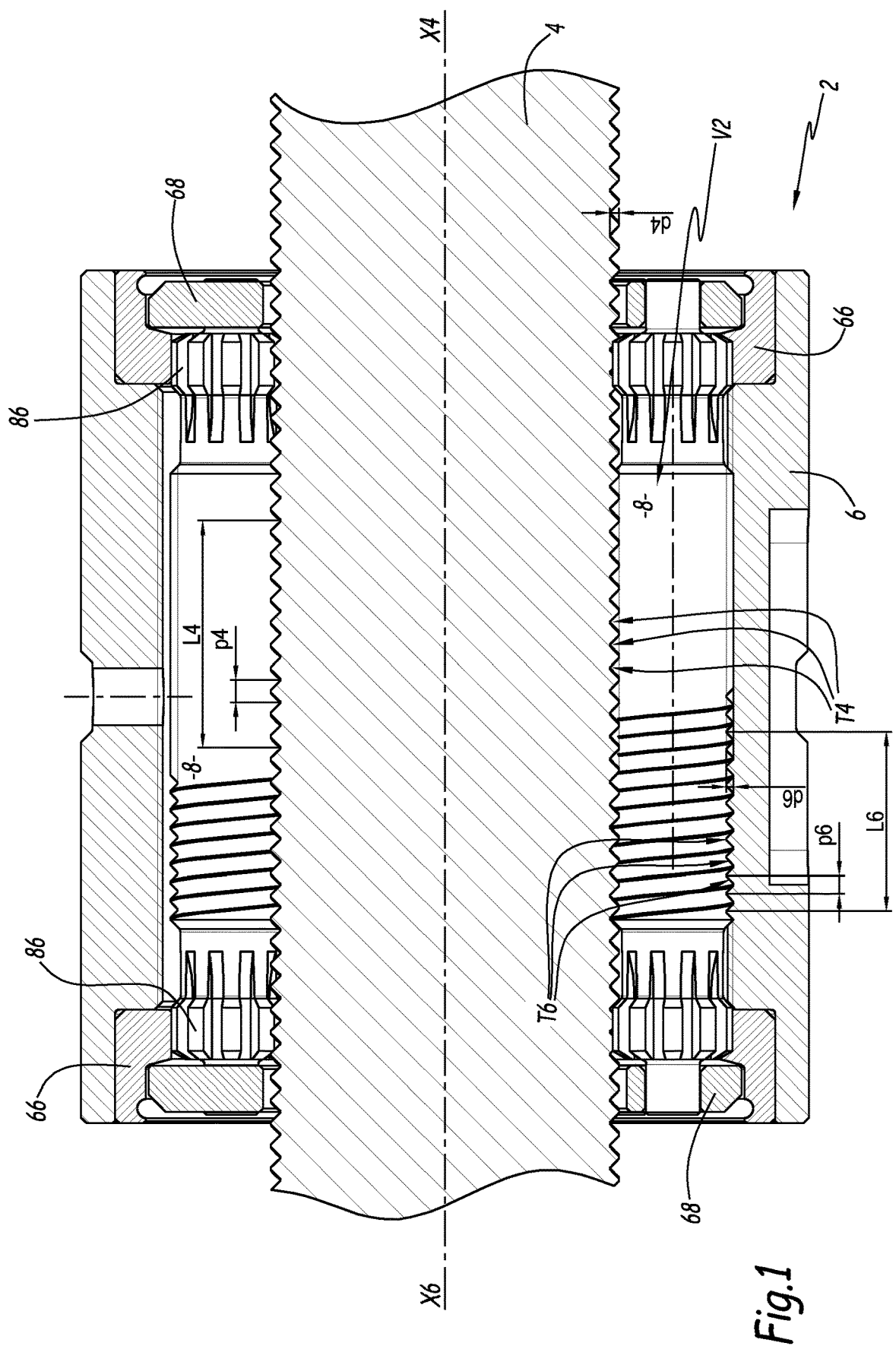
FIG. 1 is an axial cut view of a planetary roller screw mechanism according to the invention.
Figure 2:
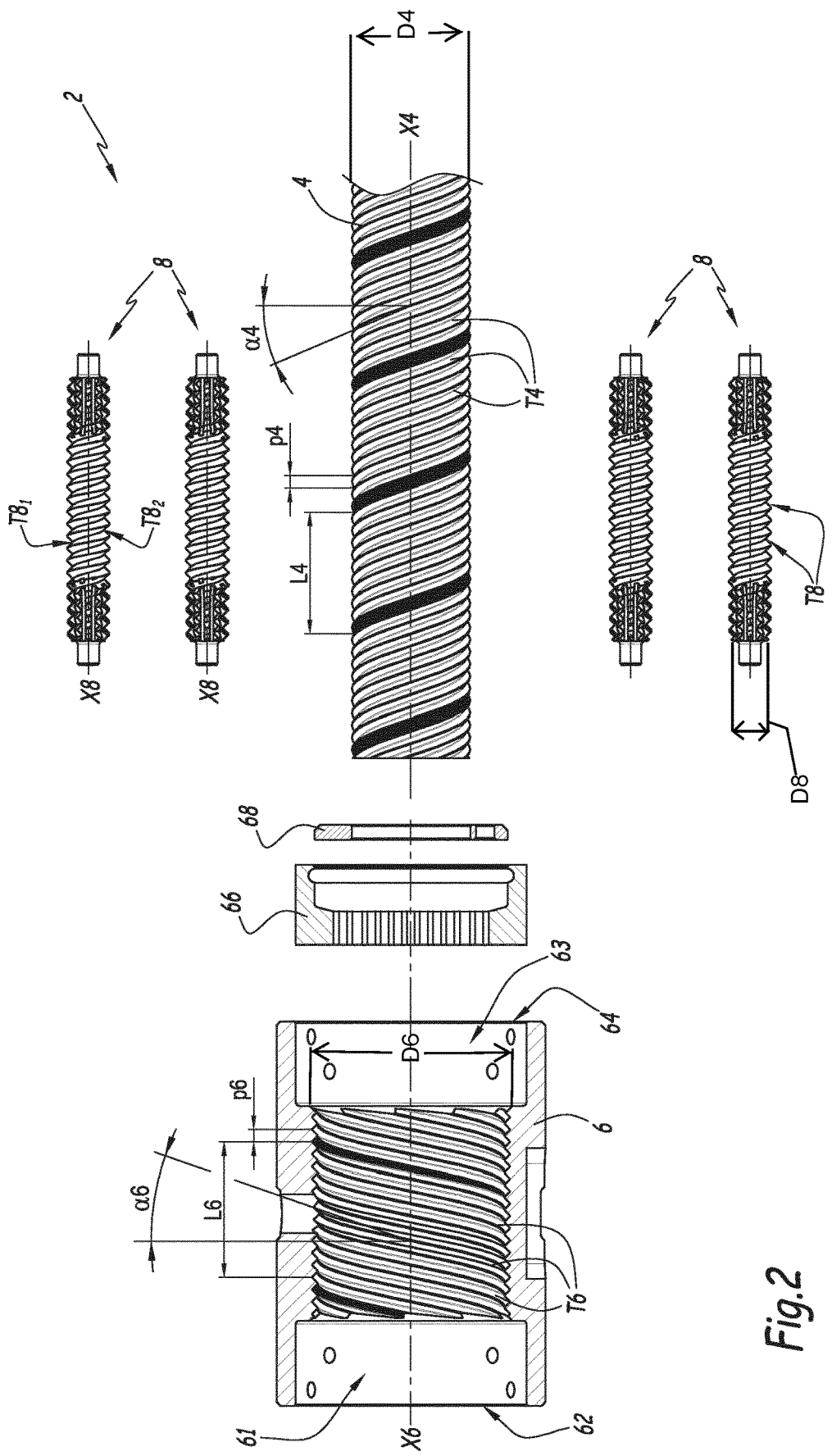
FIG. 2 is an exploded cut view of the mechanism of FIG. 1 at a smaller scale and FIG. 3 is an enlarged side view of a roller of the mechanism of FIGS. 1 and 2.

The planetary roller screw mechanism 2 represented on FIGS. 1 and 2 includes a screw shaft 4 which is centered on a longitudinal axis X4 forming a rotation axis for screw shaft 4. Mechanism 2 also includes a nut 6 which is mounted around screw shaft 4 and which is centered on an axis X6 superimposed with axis X4 in mounted configuration of mechanism 2.

Four rollers 8 are arranged in an annular volume V2 of mechanism 2, which is defined between screw shaft 4 and nut 6 and extends, radially with respect to axis X4, between these two members.

Screw shaft 4 is provided with ten identical threads T4 which are machined one after the other on its outer radial surface. Alternatively, threads T4 can be machined in one operation with a multiple groove wheel. On FIG. 2, one of these threads is marked in black. These ten threads T4 are nested, in other words imbricated, around screw shaft 4. $\alpha 4$ denotes the helix angle of one thread T4 and d4 denotes the depth of such a thread, that is a distance measured, radially with respect to axis X4, between the bottom and the top of one tooth which defines such a thread.

The inner radial surface of nut 6 is also provided with ten identical meshed threads T6 which have a helix angle $\alpha 6$ and a depth d6. One of the inner threads T6 is identified in black on FIG. 2.

It is advantageous that the number N4 of outer threads T4 equals the number N6 of inner threads T6. However, this is not compulsory and the number N6 of inner threads can, in particular, be different from the number N4 of outer threads.

In practice, the number N6 of internal threads T4 is larger than or equal to 3, preferably between 4 and 6. The number N4 of external threads T4 can equal 1 but this is not recommended as this would have some unfavorable consequences on the number of rollers, their position and the resulting lead. In practice, number N4 is often equal to number N6.

Figure 3:
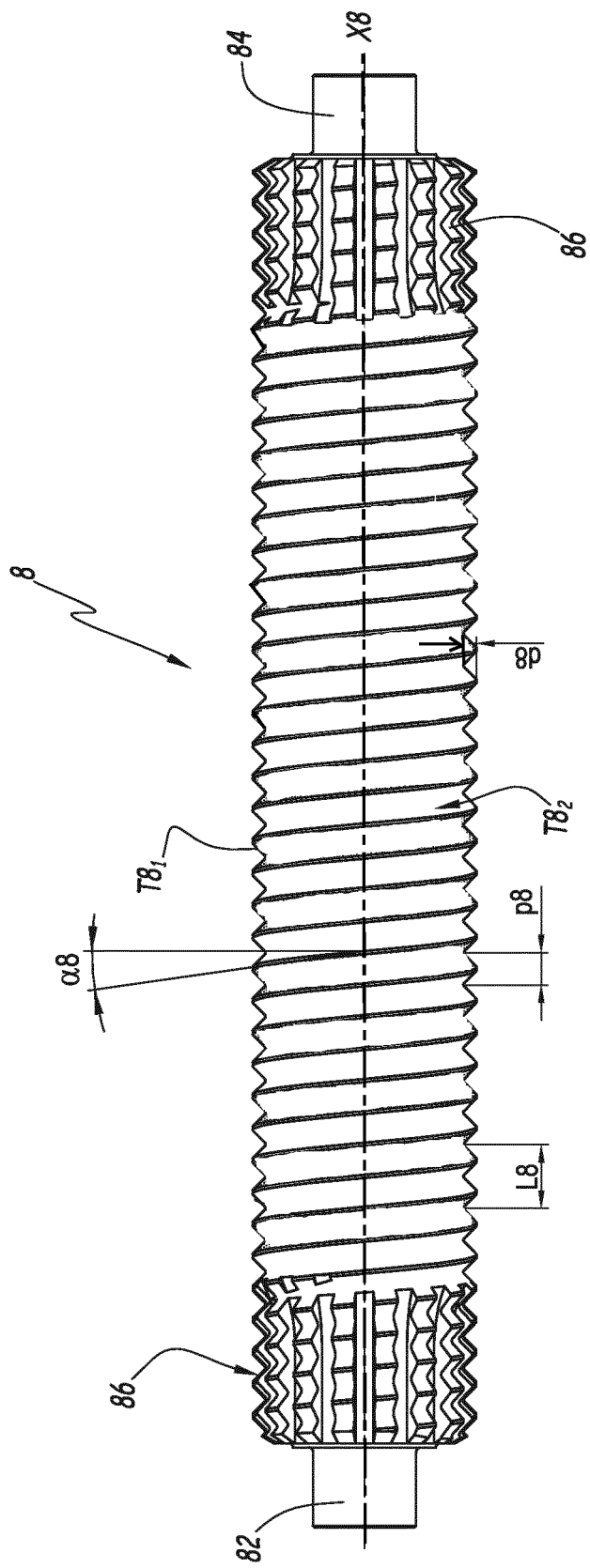

Each roller 8 is centered on an axis X8 which is parallel to axes X4 and X6 in mounted configuration of mechanism 2 and which forms a rotation axis for this roller. Each roller 8 is provided with two identical external threads T81 and T82, thread T81 being identified in grey on FIG. 3. $\alpha 8$ denotes the helix angle of threads T81 and T82 and d8 their radial depth.

Each roller 8 is provided, next to each one of its extremities 82 and 84, with a straight toothing 86 designed to be in meshing engagement with a toothed gear 66 mounted in a bore 61 or 63 machined next to an axial extremities 62 and 64 of nut 6. Alternatively, toothed gears 66 can be otherwise integral with nut 6 and machined in the same piece as the remaining part of nut 6. Thus, the two toothings 86 are in meshing engagement with the two toothed gears 66, which guarantees that the roller movements around axis X4 are controlled and synchronized within the nut, with almost no axial movement along axis X4

A cage 68 is also mounted in each bore 61 or 63 for holding rollers 8. Cage 68 is also called a "guide ring".

For the sake of simplicity, toothed gear 66 and cage 68 located in bore 61 are not represented on FIG. 2. However, they are shown on FIG. 1.

p8 denotes the pitch of threads T81 and T82. L8 denotes the lead of a roller 8, that is the length of an axial displacement of roller 8 with respect to a fixed reference when roller 8 rotates by 360°. In the present case, pitch p8 equals 8 mm. Lead L8 equals the double of pitch p8, thus 16 mm.

Here after, threads T81 and T82 are designated together as "threads T8".

Similarly, p4 denotes the pitch of threads T4 and L4 denotes the lead of these threads, whereas p6 denotes the pitch of threads T6 and L6 their lead.

One has the following relationships:

$$L4=N4 \times p4 \quad \text{(equation 1) and}$$

$$L6=N6 \times p6 \quad \text{(equation 2)}$$

Since L4 and L6 are both equal to 10, in the present example these equations can be re-written as:

$$L4=10 \times p4 \quad \text{(equation 1') and}$$

$$L6=10 \times p6 \quad \text{(equation 2)}$$

The relationship considered here-above for rollers 8 can also be expressed by the following expressions, where N8 is the number of threads T8:

$$L8=N8 \times p8 \quad \text{(equation 3) or}$$

$$L8=2 \times p8 \quad \text{(equation 3')}.$$

The following conditions are fulfilled in mechanism 2:

Condition 1: Angle $\alpha 8$ equals angle $\alpha 6$.

This condition is necessary in order to avoid that the rollers tend to come out of volume V2 when rotating around screw shaft 4. Indeed, such a relative axial movement between items 6 and 8 could induce a jamming of mechanism 2.

Condition 2: pitches p4, p6 and p8 are equal.

This condition is necessary for threads T4, T6 and T8 to match correctly.

Condition 3: The internal nominal diameter D6 of screw 6 equals the sum of the nominal external diameter D4 of screw shaft 4 and twice the external nominal diameter D8 of rollers 8. In other words, the following relationship prevails:

$$D6=D4+2 \times D8 \quad \text{(equation 4)}$$

Because of conditions 1, 2 and 3, the computation of the dimensions of the main elements of mechanism 2 leads to the following relationship:

$$D8 = \frac{D4}{N6/N8 - 2} \quad \text{(equation 5)}$$

This equation is also valid for the mechanisms of the prior art where N8 equals 1. Thus, for these mechanisms, this relationship is:

$$D8 = \frac{D4}{N6 - 2} \quad \text{(equation 5')}$$

This equation 5' shows that number N6 must be larger than or equal to 3.

In practice, numbers N4 and N6 are larger than number N8. In other words, there are more threads on screw shaft 4 and nut 6 than on rollers 8. In particular, in order for the denominator of equation 5 to be positive, it is necessary that the number N8 of threads T8 is less than half of the number N6 of threads T6.

Taking into equation 5' for a prior art planetary roller screw mechanism with a nut having a given diameter, if one increases the number N6 of threads T6, then one decreases the diameter D8 of the rollers 8. Because of equation 4, which also applies in this case, one decreases the diameter D4 of screw shaft 4, so that the capacity or robustness of the mechanism is lowered. Thus, increasing the number of threads T6 on the nut 6 of a mechanism of the prior art is not a satisfactory solution.

Let us consider the case where one needs a large lead on a planetary roller screw mechanism, e.g. 80 mm, and where N4 equals N6.

Let us consider a first comparative example 1 according to the prior art, where diameter D4 would equal 87 mm and the number of threads T4 would equal 5. Then, the pitch p4 which should be used for the threads T4 of the screw shaft 4 would equal the lead L4 divided by the number of threads L4, that is:

$$p4=L4/N4=80/5=16 \text{ mm.}$$

Such a long pitch would imply that the depth d4 of the threads T4 would be very high, so that it would, in practice, be long and very complicated to machine such threads on screw shaft 4. The number of contacts of that thread would be also reduced due to its large size. Such a geometry would not be implemented in practice.

One can consider a second comparative example 2 according to the prior art where one is satisfied with a lead L4 equal to 40 mm. In such a case, with five threads T4 on the screw shaft 4, the pitch p4 of the threads equals 8 mm, with the relationship:

$$p4=L4/N4=40/5=8 \text{ mm.}$$

On the other hand, because of equation 5', the diameter D8 of the rollers is 87/(5−2)=29 mm and, because of equation 4, the diameter D6 of the nut is 87+2×29=145 mm. Such a mechanism is reasonably easy to manufacture, but the lead is not in the range of 80 mm, since it equals 40 mm.

Let us consider a third comparative example according to the prior art where the lead would 80 mm and one would use 10 threads on screw shaft 4 with a pitch p4 equal to 8 mm, as in example 2. In such a case, the diameter D8 of the rollers would equal 87/(10−2)=11 mm because of equation 5'. And, because of equation 4, the diameter of nut 6 would equal 87+2×11=109 mm. Thus, the diameter of mechanism 2 would be reduced, which would lower its capacity and robustness. In practice, such a geometry would not be implemented.

Let us now consider the first embodiment of the invention which is represented on the figures and where a lead L4 of 80 mm is obtained with a number N4 of threads T4 equal to 10. In such a case, pitch p4 equals 8 and the diameter D8 of the rollers equals 29 mm, as in the first two comparative examples. In this example, numbers N4 and N6 each equal five times number N8.

In other words, thanks to the number N8 of threads T8, one can obtain a long lead L4 equal to 80 mm, with a relatively small pitch p4 equal to 8 mm and diameters D8 and D6 respectively equal to 29 mm and 145 mm, which guarantees a satisfying capacity or robustness of mechanism 2.

The values of the diameters, leads, numbers of threads and pitches of screw shaft 4, rollers 8 and screw 6 are explained in table 1 here-under for comparative examples 1, 2 and 3 and for the first embodiment of the invention.

TABLE 1

| | O4 | L4 | N4 | p4 | O8 | L8 | N8 | p8 | O6 | L6 | N6 | P6 |
|---|---|---|---|---|---|---|---|---|---|---|---|---|
| (all dimensions in mm) | | | | | | | | | | | | |
| Example 1 | 87 | 80 | 5 | 16 | 29 | 16 | 1 | 8 | 145 | 80 | 5 | 16 |
| Example 2 | 87 | 40 | 5 | 8 | 29 | 8 | 1 | 8 | 145 | 40 | 5 | 8 |
| Example 3 | 87 | 80 | 10 | 8 | 11 | 8 | 1 | 8 | 109 | 80 | 10 | 8 |
| Embodiment 1 | 87 | 80 | 10 | 8 | 29 | 16 | 2 | 8 | 145 | 80 | 10 | 8 |
| Example 4 | 48 | 60 | 5 | 12 | 16 | 12 | 1 | 12 | 80 | 60 | 5 | 12 |
| Example 5 | 48 | 60 | 10 | 6 | 6 | 6 | 1 | 6 | 60 | 60 | 10 | 6 |
| Embodiment 2 | 48 | 60 | 10 | 6 | 6 | 12 | 2 | 6 | 80 | 60 | 10 | 6 |

In this table, two other comparative examples 4 and 5 according to the prior art are given, when one considers a lead L4 equal to 60 mm and a number N4 of threads T4 equal to 5 or 10.

In the second embodiment of the invention, this lead L4 is obtained with ten threads T4, thus with a pitch p4 of 6 mm, whereas the diameters D8 and D6 of the rollers 8 and the nut 6 remain acceptable, respectively at 6 and 80 mm. In this example also, numbers N4 and N6 each equals five times number N8.

In practice, pitches p4, p6 and p8, which equal 6 or 8 mm in the two embodiments of the invention, can be selected between 0.2 and 10 mm in most cases, that is for a diameter D8 between 3 and 100 mm and a diameter D6 between 9 and 500 mm.

In the two embodiments of the invention, there is no need to have deep threads on the screw shaft 4, nut 6 and rollers 8. Thus, it is possible that depths d4, d6 and d8 remain below 10 mm, preferably below 6 mm, whereas beads L4 and/or L6 are larger than 50 mm, preferably larger than 60 mm. Thus, machining of the threads remains relatively easy.

In table 1, the number N8 of threads T8 equals 2 for both embodiments, as shown in the boxes with bold separation lines. However, number N8 can equal three or more.

In table 1 here-above, the lead L4 for the screw shaft 4 and the lead L6 of the nut 6 are equal, which is preferable. However, this is not compulsory and this depends on the number of threads N4 and N6.

Thanks to the invention, long leads L4 and L6 can be obtained with robust planetary rollers screw mechanisms.

In all embodiments, for the sake of robustness, diameter D8 is smaller than diameter D4.

The number of rollers 8 of mechanism 2 can be different from 4. In practice, it is larger than three and can be up to 14, depending on diameters D4, D6 and D8.

In all embodiments number N4 and N6 are the same multiples of number N8, which is preferable, since it allows free positioning of rollers 8 and free choice of the number N8 or rollers 8 However, it is possible to use different values for numbers N4 and N6.

The features of the embodiments and alternative embodiments considered here-above can be combined in order to generate new embodiments of the invention.

The invention claimed is:

1. A planetary roller screw mechanism comprising:
a screw shaft provided with a number external threads,
a nut provided with at least three internal threads, and
at least three rollers arranged, radially with respect to a central axis of the screw shaft, between the screw shaft and the nut, wherein
each roller of the at least three rollers is provided with at least two external threads, the number of external threads of the screw shaft is a multiple of the number of external threads of the each roller, and
the number of internal threads of the nut is a multiple of the number of external threads of the each roller and the number of internal threads of the nut equals the number of external threads of the screw shaft;
a nominal diameter of the each roller is related to a nominal diameter of the screw shaft via the following relationship:

$$D8 = \frac{D4}{N6/N8 - 2} \quad \text{(equation 5)}$$

where D8 is the nominal diameter of a roller,
D4 is the nominal diameter of the screw shaft,
N6 is the number of threads of the nut,
N8 is the number of threads of the roller.

2. The planetary roller screw mechanism according to claim 1, wherein the number of rollers is larger than or equal to 6.

3. The planetary roller screw mechanism according to claim 1, wherein the nominal diameter of the each roller is smaller than the nominal diameter of the screw shaft.

4. The planetary roller screw mechanism according to claim 1, wherein the pitch of the threads of the screw shaft is the same as the pitch of the threads of the nut and the same as the pitch of the threads of the each roller.

5. The planetary roller screw mechanism according to claim 1, wherein the roller screw mechanism has a lead larger than or equal to 50 mm, and the depth of all threads is smaller than or equal to 10 mm.

6. The planetary roller screw mechanism according to claim 1, wherein:
the number of threads of the screw shaft equals 10,
the number of threads of the each roller equals 2,
the pitch of all threads is between 6 and 10 mm.

7. The planetary roller screw mechanism according to claim 1, wherein the number of threads of the each roller is smaller than the number of threads of the screw shaft and smaller than the number of threads of the nut.

8. The planetary roller screw mechanism according to claim 7, wherein the number of threads of the each roller is less than half the number of threads of the screw shaft.

* * * * *